United States Patent [19]

Porter

[11] Patent Number: 4,923,432

[45] Date of Patent: May 8, 1990

[54] FLEXIBLE BOOT FOR DRIVING AXLE JOINTS

[75] Inventor: Marshall R. Porter, St. Louis, Mo.

[73] Assignee: Moog Automotive, Inc., St. Louis, Mo.

[21] Appl. No.: 308,471

[22] Filed: Feb. 10, 1989

[51] Int. Cl.⁵ ............................................. F16D 3/84
[52] U.S. Cl. .............................. 464/175; 277/212 FB
[58] Field of Search ........................ 74/18, 18.1, 18.2; 277/212 FB; 403/50; 464/173, 174, 175

[56] References Cited

U.S. PATENT DOCUMENTS

| 3,511,061 | 5/1970 | Burckhardt | 464/175 |
| 4,673,188 | 6/1987 | Matsuno et al. | 464/175 X |
| 4,735,596 | 4/1988 | Ukai et al. | 464/175 |

FOREIGN PATENT DOCUMENTS

| 5421 | 12/1985 | PCT Int'l Appl. | 464/175 |
| 2031530 | 4/1980 | United Kingdom | 277/212 FB |

*Primary Examiner*—Daniel P. Stodola
*Attorney, Agent, or Firm*—Gravely, Lieder & Woodruff

[57] ABSTRACT

A flexible molded type boot for use to retain lubricant in a constant velocity joint in which the boot is formed with a series of axially related convolutions which extend from a joint housing having a large diameter through a series of progressively smaller diameters to a smallest diameter driving shaft. The convolutions are formed with expernal peaks spaced apart by inwardly recessed valleys constituted by pairs of angularly convergent walls forming valleys between the convolution peaks. The walls taper from thinnest adjacent the external ridges to thickest adjacent the valleys where the convergent walls are joined.

5 Claims, 1 Drawing Sheet

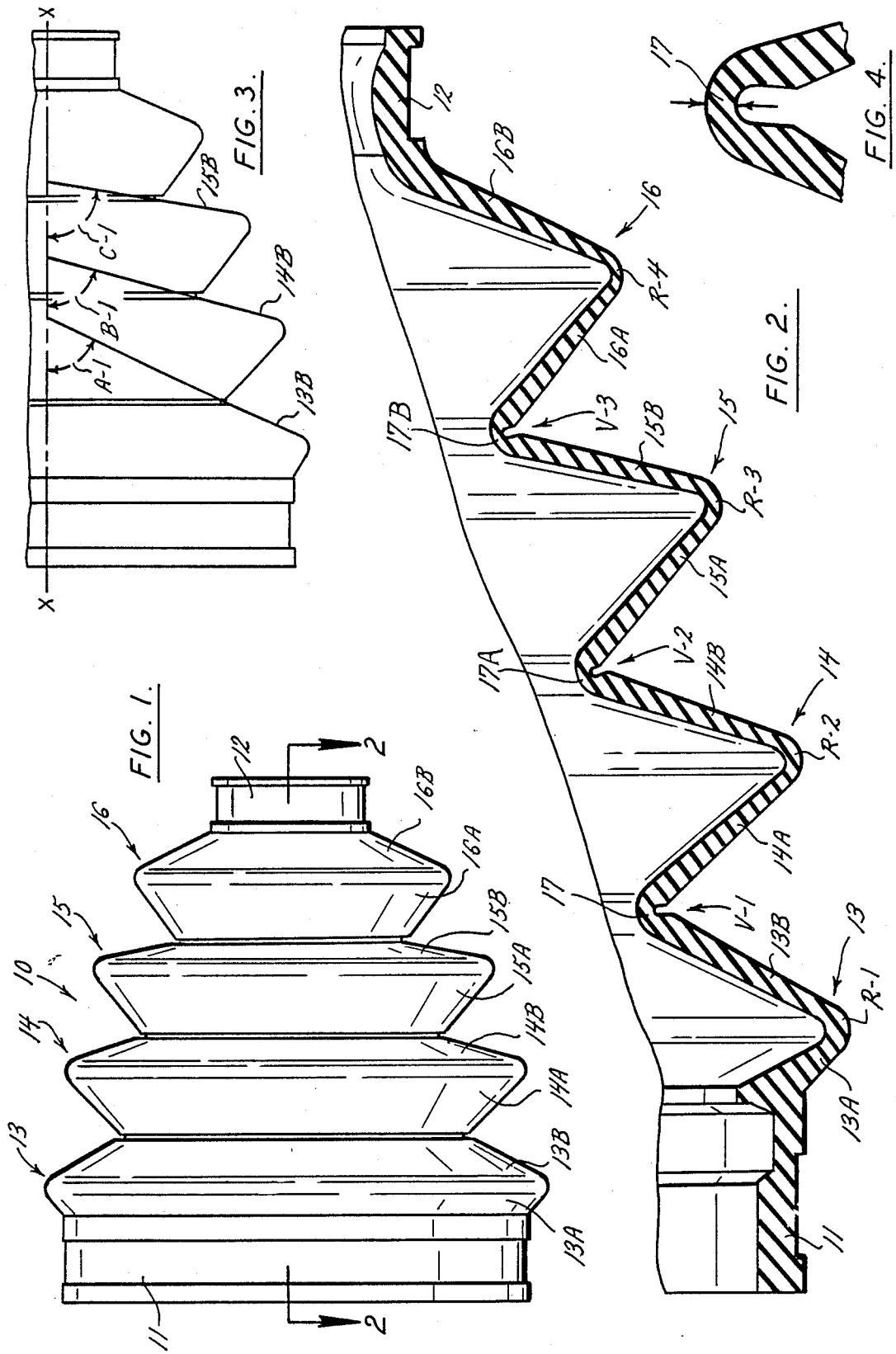

4,923,432

FLEXIBLE BOOT FOR DRIVING AXLE JOINTS

BACKGROUND OF THE INVENTION

1. Field of the Invention

This invention is concerned with convolution bellows for drive axle joints in which the convolutions over the length of the bellows share substantially more equally in flexibility.

2. Description of the Prior Art

Constant velocity or cv joints are used to transmit torque between the engine and the drive wheels for front wheel driven automobiles, and such joints may be used in other types of installations in the automotive field and elsewhere. This type of joint is protected by a bellows-type boot that encloses the joint and retains the grease or other lubricant, and such bellows must be flexible to accommodate angular cycles of motion which are particularly severe with front wheel drive installations.

A continuing problem with bellows-boots is that the convolutions have been found to flex in such manner as to rub against each other which creates wear and eventual failure in the material to retain the lubricant which fills the boot.

Examples of universal joint boots are seen in prior patents such as U.S. Pat. Nos. 4,278,262; 4,558,869; 4,673,188; and 4,786,272. These boots illustrate some of the designs that are intended to overcome problems in the automotive use of cv joint protective boots. However, problems still remain in regard to the life expectancy of a boot so that the cost and frequency of replacement of the boot can be reduced over the useful life of the cv joint.

SUMMARY OF THE INVENTION

The present flexible bellows is constructed so that it will provide longer life in service by adapting a series of convolutions of the bellows to share in the range of severity of flexure that takes place between the large and small ends of the bellows.

The important object of the present invention is to construct the bellows so that specific changes in wall thickness in each convolution from the joint housing to the axle shaft will result in each convolution sharing more equally in the flexing requirements along the length of the bellows, thereby gaining longer service life.

The bellows of the present invention is intended to have a large diameter end, a small diameter end and a series of convolutions interconnecting these ends, wherein the convolutions have inner and outer zones of connection which have specifically graduated wall thickness relationships to provide the desired sharing in the resulting flexing service.

BRIEF DESCRIPTION OF THE DRAWINGS

The invention is illustrated in the accompanying drawings, wherein:

FIG. 1 is a perspective view of one example of the flexible bellows showing the characteristics thereof;

FIG. 2 is an enlarged and fragmentary sectional detail of a portion of the flexible bellows seen along line 2—2 in FIG. 1;

FIG. 3 is a fragmentary side view similar to FIG. 1 to show the variations in the angular relationship of the convolution walls relative to the longitudinal central axis of the booth; and FIG. 4 is a fragmentary sectional detail of one of the valleys in FIG. 2 to indicate the location of the wall thickness.

DESCRIPTION OF THE INVENTION

One example of the present invention is seen in FIG. 1 where the bellows 10 is formed of suitable moldable and flexible material, such as polyurethane or the like. The bellows is formed with a large diameter end 11 adapted to fit over the housing (not shown) of a constant velocity or cv joint and be secured by a suitable clamping device (not shown). An example of a cv joint housing is illustrated in U.S. Pat. No. 4,673,188. The opposite and small diameter end 12 is adapted to be fitted over the driving shaft (not shown) which extends from the cv joint and is adapted to rotate and swing in an appropriate universal path which is well known in the art of cv joints. Attention is again directed to the Pat. No. 4,673,188 patent.

The respective ends 11 and 12 of bellows 10 are connected by a series of convolutions 13, 14, 15 and 16.

The respective convolutions progressively decrease in diameter at the peaks from the large end 11 to the small end 12. At the same time the wall thickness tapers but decreases in each convolution in order for each convolution to share substantially more equally in the flexing required of the bellows. As an example, the walls 13B and 14A in the adjacent convolutions 13 and 14 each taper to an increase in thickness up to the apex of the valley V-1. The walls 14B and 15A in the adjacent convolutions 14 and 15 each taper in thickness up to the apex of the valley V-2, and these walls 14B and 15A are thinner than the walls 13B and 14A. In like manner, the walls 15B and 16A in the adjacent convolutions 15 and 16 are tapered to increase the thickness up to the apex of the valley V-3, but the increase is less than for the walls 14B and 15A.

For example, where the walls 13B and 14A meet to form valley V-1, that joint has a thickness of 0.053 plus or minus 0.010 inches; the thickness of the material at peak R-2 where the walls 14A and 14B meet is less than for the valley V-1; the thickness of the material at valley V-2 where walls 14B and 15A meet is less than at the valley V-1; the thickness of the material where the walls 15A and 15B meet at R-3 is less than at the valley V-2; the thickness of the material at the valley V-3 where the walls 15B and 16A meet is less than at the peak 15; and finally the thickness of the material at the peak R-4 where the walls 16A and 16B meet is about 0.040 plus or minus 0.010 inches. There is a progressive thinning of the connections at peaks R-1, R-2, R-3 and R-4, and a progressive thinning of the material at the valleys V-1, V-2 and V-3.

It can be seen in FIG. 2 that one of the important characteristics of the present boot is to vary the thickness of the boot wall at the respective hinge elements 17 at the valles V-1, V-2 and V-3 so that as the boot rotates and also flexes through whatever angle is followed by the shaft running through the boot, the walls that form the valleys in each rotational cycle will tend to fold toward each other, but the contact that does occur between convolute walls will not develop a hard compressive surface-to-surface abutment so that there is little or no surface stress induced in the walls approaching the valleys. The result is that the flexing of the various convolutions making up the boot share substantially equally in the flexure during the alternate folding and extension of the adjacent convolutions. The sharing in the alternate folding and extension of the adjacent convolutions is obtained by varying the angles the walls 13B, 14B and 15B make with the longitudinal axis X—X of the boot. For example, in FIG. 3 the slope of the convolution wall 13B makes an acute angle A-1 with axis X—X; the slope of wall 14b makes a somewhat larger acute angle B-1, and the slope of wall 15B makes a still larger acute angle C-1 with the axis X—X. This progressive change in the slope the convolution walls make with the axis X—X of the boot 10 establishes the convolution wall flexure such that the convolutions tend to collapse substantially concurrently or together rather than first one convolution, then the next convolution, and the next convolution, such as in a one-after-another fashion.

The presence of more material at the internal valleys, where the flexing is the most severe, takes care of the stresses and thereby provides a longer service life for the entire boot. As shown in FIG. 4 the thickness of the hinge element 17 interconnecting walls 13B and 14A is greater than the thickness of the hinge element 17A, and hinge element 17A is thicker than the hinge element 17B. Furthermore, in its position with the several convolutions normal to the axis X—X of the boot, the included angles between walls 13B and 14A is larger than the like angle between walls 14B and 15A, and that latter included angle is larger than the included angle between walls 15B and 16A.

It should be apparent from the disclosure in FIGS. 1 and 2 that there are a series of convolutions 13, 14, 15 and 16 arranged in that order beginning at the enlarged diameter end 11 of the boot and progresses to the small diameter end 12 of the booth. Each convolutions is formed by a pair of angularly diverging walls, such as walls 13A and 13B for the convolution 13 or the angularly divergent walls 15A and 15B for the convolution 15. The respective convolutions are integrally interconnected and the divergent walls, such as walls 13B to and including wall 16B are directed inwardly so that the inner ends thereof form valleys which are denominated V-1, V-2 and V-3. The normal construction of a constant velocity joint as used in the automotive field is attached to the constant velocity unit in a housing (not shown) to which the large diameter end 11 of the boot is connected, and the driving shaft (not shown) extends out of that constant velocity unit and runs through the small diameter end 12 of the boot where a case seal is located. In operation, as the shaft rotates it carries with it the boot and the shaft can describe a circular movement about the center of the universal joint. The result is that the convolution closest to that center will flex more than those farther away. Thus, the boot will periodically compress or fold portions of the convolutions on one side and extend the opposite side of the same convolutions in a manner that is illustrated in prior art Pat. No. 4,673,188. In the example of the prior art just noted, it is clearly illustrated that as the convolutions of the boot are compressed or folded, there is a compaction of the portions of the convolutions to such an extent that the exterior surfaces are brought into rubbing contact which shortens the service life of the boot. A unique feature of the subject invention resides in the provision (as seen in FIG. 2) of the inner ends of the divergent walls which form the valleys (V-1, V-2 and V-3 having a connecting element 17 which makes a working connection between the divergent walls of the respective convolutions. That connecting element 17 is diminished in such a way as to allow the walls to approach each other but to maintain a slight contact. This is a unique way of preventing the walls of the convolutions from moving into destructive rubbing contact with each other when the portions of the convolutions are on the side where the shaft causes the boot to fold during its angular motion.

It is also illustrated in FIG. 2 that the divergent walls of the convolutions are tapered in thickened so as to provide substantial mass in the walls adjacent the position of the element 17 to provide for a strength of material that will not work harden. The tapering thickness of the convolution walls which are directed into positions to form the valleys V-1, V-2 and V-3 have a tapered section as shown in FIG. 2 so that the presence of the material of the boot is strengthened in the critical area of the convolutions where they are periodically compressed or folded and extended as the shaft described its angular rotation which is a typical function of a constant velocity joint.

It should be apparent from the foregoing description of the unique characteristics of the flexible bellows that the objects of the invention are adhered in a simple and unique manner.

What is claimed is:

1. A boot for use with a universal joint for driving a shaft that has freedom of angular movement during shaft rotation about the axis of the shaft, said boot characterized in that:
   (a) the boot is an axially elongated hollow body formed with walls of a flexible material and shaped to provide a series of convolutions extending from a large diameter end of the boot to a small diameter end of the boot wherein,
      (1) each convolution is formed with an externally presented valley between a pair of externally presented peaks, and
      (2) the walls forming valleys beginning at the large diameter of the boot varying progressively from thicker at the large diameter end of the boot to gradually thinner at the small diameter end of the boot.

2. A boot according to claim 1, wherein the wall thickness adjacent each peak is progressively thinner from the large diameter end of the boot to the small diameter end of the boot.

3. A boot according to claim 1, wherein the walls forming each convolution valley meet at hinges, and the thickness of the hinges is progressively thinner from the larger diameter end of the boot to the small diameter end of the boot.

4. A boot according to claim 3, wherein the included angle formed by the walls in each convolution valley relative to the longitudinal axis of the boot is progressively larger from the large diameter end of the boot toward the small diameter end of the boot.

5. A boot according to claim 1, wherein the formations of the valleys and peaks of progressively varying wall thickness force the walls to share the flexing along the length of the boot.

* * * * *